United States Patent
Ashwood-Smith et al.

(10) Patent No.: US 11,438,823 B2
(45) Date of Patent: Sep. 6, 2022

(54) ORTHODROMIC ROUTING

(71) Applicants: Peter Ashwood-Smith, Gatineau (CA); Hassan Halabian, Kanata (CA); Mehdi Arashmid Akhavain Mohammadi, Ottawa (CA)

(72) Inventors: Peter Ashwood-Smith, Gatineau (CA); Hassan Halabian, Kanata (CA); Mehdi Arashmid Akhavain Mohammadi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/887,675

(22) Filed: May 29, 2020

(65) Prior Publication Data
US 2021/0377841 A1 Dec. 2, 2021

(51) Int. Cl.
*H04W 40/24* (2009.01)
*H04W 84/18* (2009.01)
*H04W 40/02* (2009.01)
*H04W 40/20* (2009.01)
*H04L 45/02* (2022.01)

(52) U.S. Cl.
CPC ........... *H04W 40/248* (2013.01); *H04L 45/02* (2013.01); *H04W 40/023* (2013.01); *H04W 40/20* (2013.01); *H04W 84/18* (2013.01)

(58) Field of Classification Search
CPC . H04W 40/248; H04W 40/023; H04W 40/20; H04W 84/18
See application file for complete search history.

(56) References Cited

U.S. PATENT DOCUMENTS 5,930,348 A 7/1999 Regnier et al.
6,147,980 A 11/2000 Yee et al.
(Continued)

FOREIGN PATENT DOCUMENTS

CN 1681257 A 10/2005
CN 101119372 A 2/2008
(Continued)

OTHER PUBLICATIONS

Edoardo Benzi et al "Optical Inter-Satellite Communication: the Alphasat and Sentinel-1A in-orbit experience" SpaceOps Conferences, May 16-20, 2016, Daejeon, Korea; 14th International Conference on Space Operations.
(Continued)

*Primary Examiner* — Shukri Taha

(57) ABSTRACT

A method and apparatus for routing packets in a network, such as a satellite mesh network. Geographic routing is employed in which packets specify their physical destination location. Network nodes maintain physical location information for nodes, along with routing information, for a limited portion of the network which is local thereto. At each node and for each packet, a target node is selected from the limited portion. The target node may be the node which is closest in orthodromic distance to the physical destination location. Based on the routing information, a next node belonging to the limited portion of the network and located along an available network path between the node and the target node is determined, and the packet is forwarded to the next node.

23 Claims, 11 Drawing Sheets

(56) References Cited

U.S. PATENT DOCUMENTS

| | | |
|---|---|---|
| 6,208,295 B1 | 3/2001 | Dogan |
| 6,804,199 B1 | 10/2004 | Kelley et al. |
| 6,816,460 B1 | 11/2004 | Ahmed et al. |
| 7,613,121 B2 | 11/2009 | Chou |
| 7,945,272 B2 | 5/2011 | Kim |
| 2004/0028060 A1 | 2/2004 | Kang |
| 2005/0152333 A1 | 7/2005 | Smith |
| 2005/0198286 A1 | 9/2005 | Xu |
| 2007/0147254 A1 | 6/2007 | Larsson |
| 2007/0239349 A1 | 10/2007 | Ohnishi et al. |
| 2009/0046732 A1 | 2/2009 | Pratt, Jr. et al. |
| 2010/0008368 A1 | 1/2010 | Karloff |
| 2012/0014316 A1 | 1/2012 | Rahman |
| 2012/0173527 A1 | 7/2012 | Thiesson |
| 2013/0036236 A1 | 2/2013 | Morales et al. |
| 2013/0232565 A1 | 9/2013 | O'Connor et al. |
| 2014/0044008 A1 | 2/2014 | Skalecki et al. |
| 2014/0126416 A1 | 5/2014 | Yu et al. |
| 2014/0177522 A1* | 6/2014 | Marshack .......... H04B 7/18513 370/316 |
| 2014/0229405 A1 | 8/2014 | Govrin |
| 2014/0278590 A1 | 9/2014 | Abbassi |
| 2014/0379929 A1 | 12/2014 | Cicic et al. |
| 2016/0057004 A1 | 2/2016 | Ge |
| 2016/0323175 A1* | 11/2016 | Liu .................... H04L 12/6418 |
| 2017/0117978 A1 | 4/2017 | Ko |
| 2017/0239394 A1 | 8/2017 | Fromm et al. |
| 2019/0081884 A1 | 3/2019 | Spohn |
| 2019/0104056 A1 | 4/2019 | Poorrezaei |
| 2020/0162335 A1 | 5/2020 | Chen et al. |
| 2020/0382445 A1 | 12/2020 | Calmon |
| 2021/0194808 A1* | 6/2021 | McCormick ......... H04L 45/123 |
| 2021/0226879 A1 | 7/2021 | Indiresan et al. |
| 2022/0026519 A1 | 1/2022 | Wu et al. |

FOREIGN PATENT DOCUMENTS

| | | |
|---|---|---|
| CN | 102118456 A | 7/2011 |
| CN | 102752725 A | 10/2012 |
| CN | 103891352 A | 6/2014 |
| CN | 103986512 A | 8/2014 |
| CN | 104579454 A | 4/2015 |
| CN | 105657777 A | 6/2016 |
| CN | 107070798 A | 8/2017 |
| CN | 107231183 A | 10/2017 |
| CN | 107979409 A | 5/2018 |
| CN | 108353439 A | 7/2018 |
| CN | 108390713 A | 8/2018 |
| CN | 108449774 A | 8/2018 |
| CN | 108989223 A | 12/2018 |
| CN | 110505153 A | 11/2019 |
| CN | 111587580 A | 8/2020 |
| CN | 112260742 A | 1/2021 |
| EP | 2853068 A1 | 4/2015 |
| WO | 2016069077 A1 | 5/2016 |
| WO | 2019173127 A1 | 9/2019 |
| WO | 2020113214 A1 | 6/2020 |
| WO | 2020193445 A1 | 10/2020 |

OTHER PUBLICATIONS

Hemani Kaushal et al "Optical Communication in Space: Challenges and Mitigation Techniques"; Citation information DOI 10.1109/COMST.2016.2603518, IEEE Communications Surveys & Tutorials.

M. Gregory et al "TESAT laser communication terminal performance results on 5.6Gbit coherent inter satellite and satellite to ground links"; International Conference on Space Optics—ICSO 2010, Rhodes Island, Greece, Oct. 4-8, 2010.

Zengyin Yang et al "Modeling and Routing for Predictable Dynamic Networks"; arXiv.org > cs > arXiv: 1704.00885; Aug. 17, 2018.

"Iridium NEXT: A Global E?ort to Launch the Future of Global Communications"; Apr. 19, 2013 | Featured Stories, Iridium NEXT.

Hueseyin Uzunalioglu et al "A routing algorithm for connectionoriented Low Earth Orbit (LEO) satellite networks with dynamic connectivity"; Published 2000 • Computer Science • Wireless Networks.

Fargnoli, Joseph D. (2016), Technical Narrative, Theia Holdings A, Inc. (Theia Satellite Network), 1455 Pennsylvania Ave., Ste. 600, Washington, D.C., District of Columbia, United States.

"Geographic Routing"; Wikipedia, Nov. 20, 2019; https://en.wikipedia.org/wiki/Geographic_routing.

"Chapter 6 Geometric Routing" Mobile Computing Winter 2005 / 2006; https://disco.ethz.ch/courses/ws0506/mobicomp/lecture/6/Chapter6GeometricRouting4Slides_v2.pdf.

"Haversine Formula", Wikipedia, Aug. 7, 2019; https://en.wikipedia.org/wiki/Haversine_formula.

Sahhaf et al. Scalable and energy-efficient Optical Tree-based Greedy Router, 2013 15th International Conference on Transparent Optical Networks (ICTON) ,Sep. 19, 2013, 5 pages.

McCormick, William Carson et al. U.S. Appl. No. 16/721,171, filed Dec. 19, 2019.

Akhavain Mohammadi, Mehdi Arashmid U.S. Appl. No. 17/117,333, filed Dec. 10, 2020.

Halabian, Hassan U.S. Appl. No. 16/888,023, filed May 29, 2020.

McCormick, William Carson U.S. Appl. No. 16/882,952, filed May 26, 2020.

Akhavain Mohammadi, Mehdi Arashmid et al. U.S. Appl. No. 17/141,824, filed Jan. 5, 2021.

Akhavain Mohammadi, Mehdi Arashmid U.S. Appl. No. 17/140,668, filed Jan. 4, 2021.

Akhavain Mohammadi, Mehdi Arashmid U.S. Appl. No. 17/167,540, filed Feb. 4, 2021.

Ericsson Latency analysis of SCell BFR solutions 3GPPTSG-RAN }VGI Meeting #97, R1-1907438 May 17, 2019 (May 17, 2019), 4 pages.

* cited by examiner

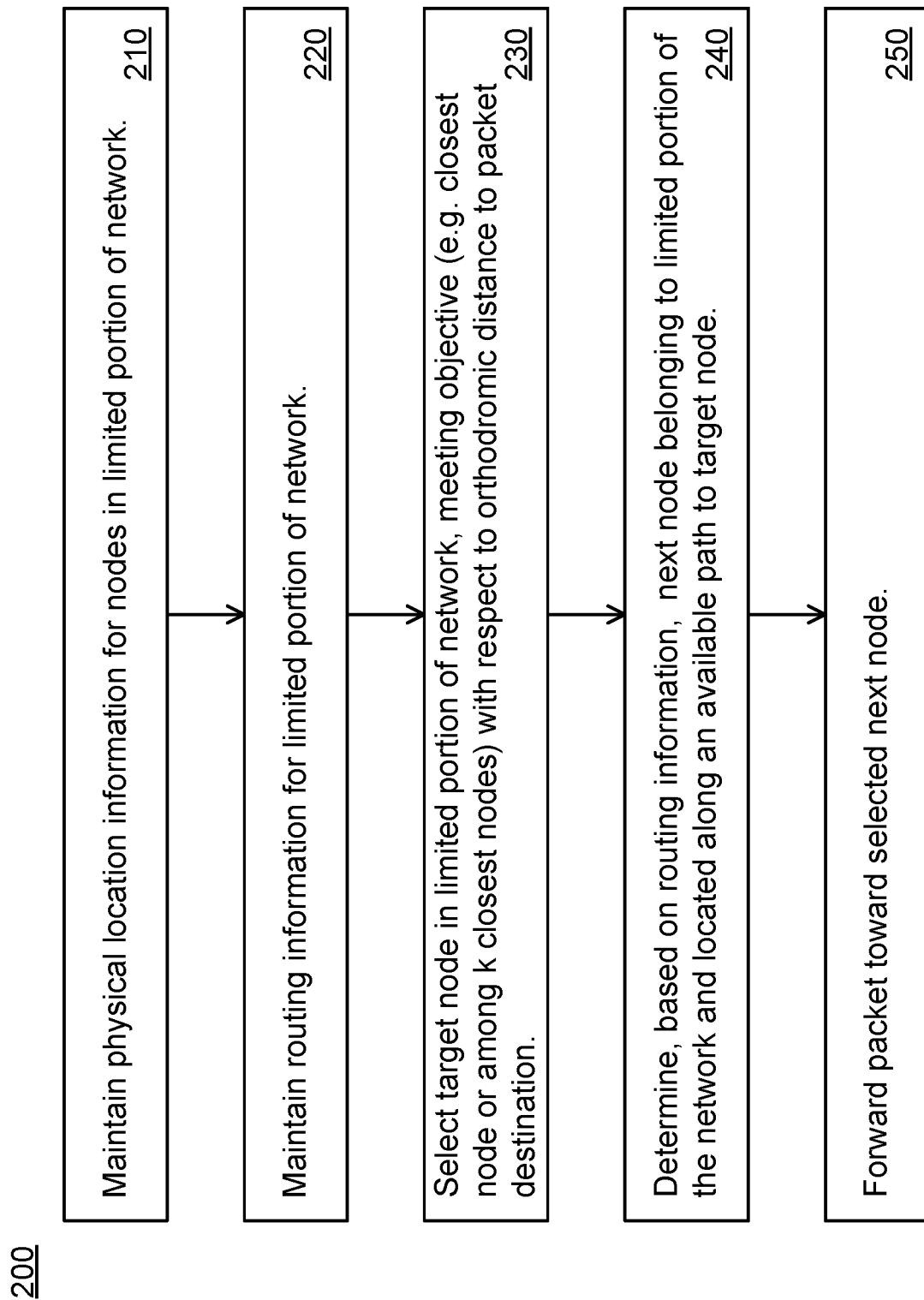

ORTHODROMIC ROUTING

CROSS-REFERENCE TO RELATED APPLICATIONS

This is the first application filed for the present invention.

FIELD OF THE INVENTION

The present invention pertains to packet-based data networks, such as optical satellite mesh networks, and in particular to a method and apparatus for supporting packet forwarding and routing in such networks.

BACKGROUND

Low earth orbit (LEO) satellite constellations are being developed to provide, among other things, Internet routing services. It is currently proposed that a group of satellites would be distributed in space and organized into a mesh network. Free space optical (i.e. laser) links are proposed as one way for providing high-bandwidth network connectivity between satellites. Other types of links, such as radiofrequency or microwave-based links are also possible. Use of LEO satellite systems generally leads to lower latency than medium earth orbit or geostationary orbit systems, but requires large numbers of satellites.

Data packets can be routed through a satellite mesh network along a variety of paths. Because the satellites are moving rapidly with respect to the surface of the earth, routing of packets toward an earth-based destination requires consideration of satellite locations and proximity to the destination location. Rapidly computing effective routing paths in such scenarios is computationally intensive and current routing methods are subject to improvement and customization to satellite mesh networking.

Geographic routing involves routing of packets based on geographic position information without necessarily relying on knowledge of network topology. Such routing schemes are known for wireless networks but have not been extensively developed for satellite networks. Furthermore, these schemes are subject to improvement in terms of computational efficiency, applicability to scenarios to satellite mesh networks, or both.

Therefore, there is a need for a method and apparatus for supporting packet forwarding in satellite mesh networks and similar networks that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for packet forwarding and routing, for example in satellite networks.

In accordance with embodiments of the present invention, there is provided a method for routing a data packet in a network. The data packet specifies a physical location of a destination for that data packet. The method is performed at a first node of the network in possession of the data packet. The method includes maintaining physical location information for nodes in a limited portion of the network directly coupled to the first node, and maintaining routing information for the limited portion of the network. The limited portion of the network may include at least one node which is indirectly coupled to the node via at least one intermediate node. The method includes selecting, from among the nodes in the limited portion of the network, a target node that meets a predetermined objective with respect to orthodromic distance to the physical location of the destination for the data packet. The method includes determining, based on the routing information, a next node belonging to the limited portion of the network and located along an available network path between the node and the target node. The method further includes forwarding the packet toward said next node.

In accordance with embodiments of the present invention, there is provided a method for routing a data packet in a network, the data packet specifying a physical location of a destination for the data packet. The method includes performing the above-described method steps at some or all nodes of the network, when those nodes are in possession of the data packet.

In accordance with embodiments of the present invention, there is provided an apparatus for routing a data packet in a network. The data packet specifies a physical location of a destination for the data packet. The apparatus is located at a first node of the network in possession of the data packet and includes a network interface and processing electronics. The apparatus is configured to maintain physical location information for nodes in a limited portion of the network directly coupled to the first node. The apparatus is configured to maintain routing information for the limited portion of the network. The limited portion of the network includes at least one node which is indirectly coupled to the node via at least one intermediate node. The apparatus is further configured to select, from among the nodes in the limited portion of the network, a target node that meets a predetermined objective with respect to orthodromic distance to the physical location of the destination for the data packet. The apparatus is further configured to determine, based on the routing information, a next node belonging to the limited portion of the network and located along an available network path between the node and the target node. The apparatus is further configured to forward the packet toward said next node.

In accordance with embodiments of the present invention, there is provided a system for routing a data packet in a network, the data packet specifying a physical location of a destination for the data packet. The system includes a plurality of network nodes or associated apparatuses of network nodes, each configured to operate as described above when in possession of the data packet. That is, there is provided system for routing a data packet in a network, the data packet specifying a physical location of a destination for the data packet, the system comprising a plurality of nodes of the network, each node comprising a network interface and processing electronics and configured, when in possession of the data packet, to: maintain physical location information for respective nodes in a limited portion of the network directly coupled to the node, and maintain routing information for the limited portion of the network, said limited portion of the network comprising at least one node which is indirectly coupled to the node via at least one intermediate node; select, from among the nodes in the limited portion of the network, a target node that meets a predetermined objective with respect to orthodromic distance to the physical location of the destination for the data packet; determine, based on the routing information, a next node belonging to the limited portion of the network and located along an available network path between the node and the target node; and forward the packet to said next node.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 2 illustrates a method for routing a data packet in a network, according to embodiments of the present invention.

It will be noted that throughout the appended drawings, like features are identified by like reference numerals.

DETAILED DESCRIPTION

Figure 1:
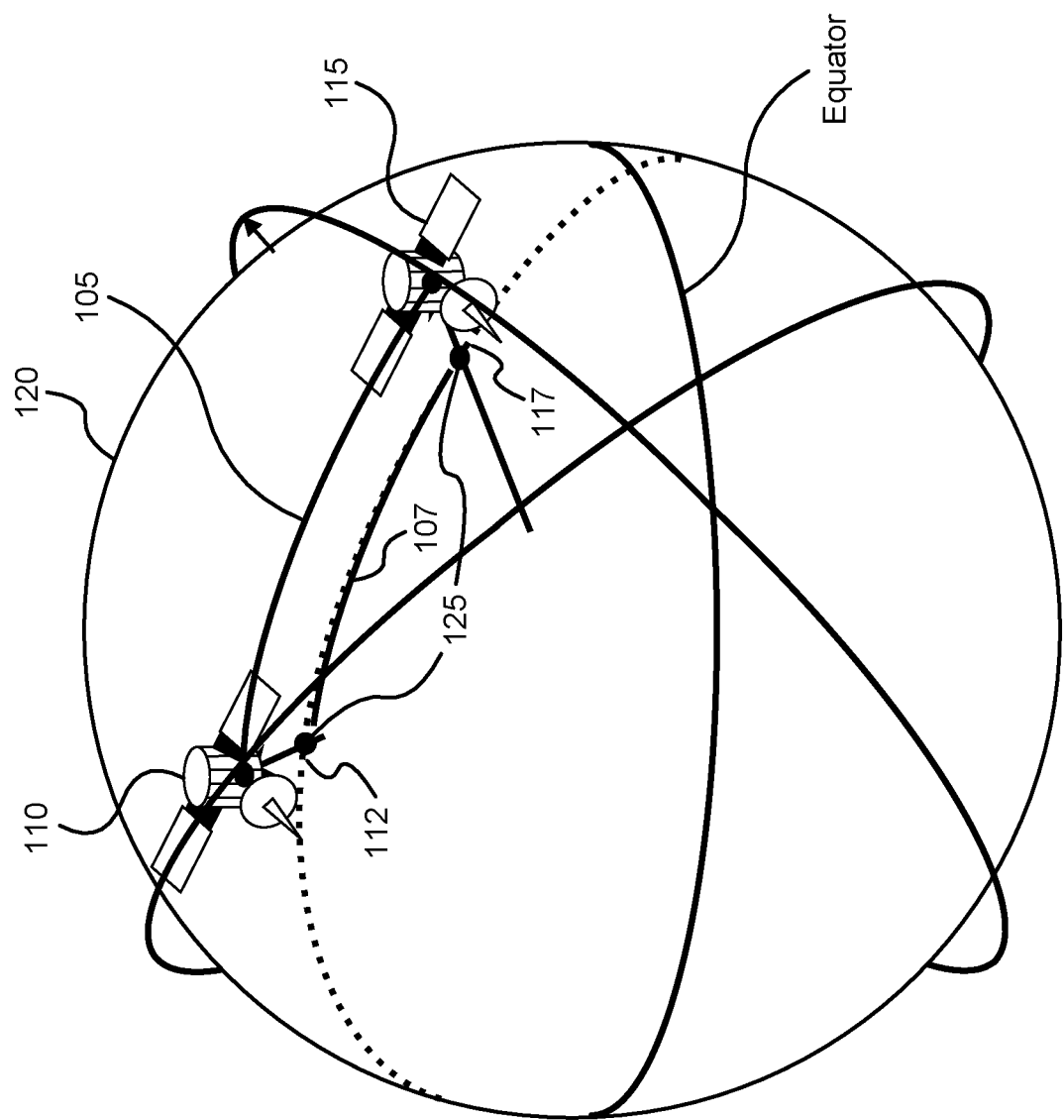
FIG. 1 illustrates orthodromic distance between two satellites orbiting a sphere (earth).

As used herein, the term "about" should be read as including variation from the nominal value, for example, a +/−10% variation from the nominal value. It is to be understood that such a variation is always included in a given value provided herein, whether or not it is specifically referred to.

Satellite-based networks potentially provide global connectivity and may also provide new coverage extensions in Fifth Generation (5G) communications technologies, as defined for example by the $3^{rd}$ Generation Partnership Project (3GPP). Overall industry interest is to deploy inter-satellite links to route user traffic over multiple satellites. In this regard, use of low earth orbits (LEO) satellite systems may be appropriate, as such systems have lower round trip latency and lower launch costs compared to Medium earth orbit (MEO) and Geostationary earth orbit (GEO) systems. However, an effective global network requires potentially large numbers of LEO satellites. On the other hand, the dynamic nature of satellite network constellations presents challenges for existing routing protocols due for example to the existence of an orbital seam, the size of network, and the requirement to timely communicate network changes to all nodes as they occur.

Embodiments of the present invention address network routing challenges in the context of satellite networks. Specific focus is in the application to non-terrestrial massive (satellite) polar and walker-delta constellation networks in order to provide global communications services that may not be supported by terrestrial (e.g. wire line or fibre-based) networks. Various embodiments provide for a flat network routing paradigm in which each network node is only required to have local knowledge of network conditions. This limits the requirement to propagate network condition updates (e.g. via flooding link status update messages) through the network. In particular, in various embodiments, the updates only need to be communicated locally within a limited network region. Because only local knowledge is utilized, routing calculation time and control-plane/data plane processing complexity may also be limited. This can be particularly important considering the massive scale of the LEO satellites (where existing terrestrial routing mechanisms do not scale) and also the limited on-board processing available on the LEO satellite nodes.

While GEO satellites are stationary to the side of the earth they are facing, MEO and LEO satellites are considered to be mobile with some time periodicity. That is, they meet the same point of the earth after a specific time period which is dependent on their altitude. GEO satellites are located at 22,236 miles (35,786 kilometers) above Earth's equator. Due to high altitude of these satellites and long the round trip delay, GEO satellites are not a proper option for broadband, low delay data networks. LEO satellites however, provide global coverage over the earth and are capable of reusing frequency more effectively. LEO satellite networks can provide ubiquitous connectivity with low latency. A characteristic of these satellite networks is that many satellites are typically needed to provide global coverage, mainly due to the low altitude of the individual satellites.

In satellite communication technologies, a satellite constellation is defined as a group of satellites with coordinated ground coverage and shared control rotating in LEO orbits. Two main satellite constellations are "polar constellation" and "walker delta constellation". Walker delta constellations are thought to provide better uniform coverage over the earth almost everywhere except poles, where no coverage is provided. Polar constellations however provide a dense coverage over the poles and less dense coverage over the equator.

Satellite network nodes may have two types of interfaces: Ground communication interfaces, and Inter-satellite link (ISL) communication interfaces. The ground communication interfaces can be microwave systems operating in X-band or ka-band. The ISL interfaces can use communication lasers and can provide for high-speed optical free-space communication links between the satellite nodes. ISL links include intra-orbit links, i.e. links between (typically adjacent) satellites in a common orbit but spaced apart, and inter-orbit links, i.e. links between satellites in different (typically adjacent) orbits.

Due to the dynamic nature of the satellite networks, the ISL characteristics also change dynamically. Even for intra-orbit ISLs where link distance is constant, the link behavior may change as the satellites pass over different parts of the earth (e.g. at the poles). The dynamic range of characteristics for the ISLs is significantly larger for inter-orbit ISLs for both polar and walker delta constellations. Due to the dynamically changing ISL links, attributes the network topology in satellite networks is considered to change dynamically. The impact of network topology changes, link failures and link creations, link level optical impairments as well as Doppler effect makes packet routing a significant challenge in satellite data networks. This is particularly the case in dense LEO satellite networks where network events are frequent. Packet addressing is another challenge. Additionally, satellite onboard processing capability is limited and therefore it is desirable to limit the amount of onboard processing that is required to perform functions such as network routing.

One issue in satellite networks relates to flooding behavior and integration with ground segments of the network. Internet protocol (IP) based routing does not scale well with very large flat satellite networks requiring minimum delay (distance) routing. This is due to the fact that the satellite network topology is dynamic and minimum distance paths change over time.

Embodiments of the present invention provide for a routing scheme potentially applicable to massive large scale satellite networks. Spatial location can be used as parts of network node identifiers. Geographic routing of packets can be used, along with a link cost metric defined as or correlated with the length of a communication link. As a result, and in some embodiments, network routes for packet forwarding may be determined solely based on positional (e.g. longitude/latitude) information. This may facilitate routing of packets from source to destination with substantially minimal distance of communication links.

Link failures occur frequently in large scale massive satellite networks. In single-hop geographical routing with link failures, alternate path routing may take packets farther from their destination. This tends to lead to failure of single-hop geographical routing. This problem arises due to the fact that the entire region of the network may not be visible to each node. Since performing network status updates (e.g. via flooding) is time consuming, network convergence is relatively slow. When network status changes are frequent, this can result in network information at each node failing to adequately track the actual network state.

When using a LEO satellite mesh network to route a packet to a ground-based destination, it is notable that the satellite constellation typically moves rapidly relative to the destination. This makes it challenging to determine, at a given time, which path to forward the packet on so that it efficiently reaches the destination. For example, it may be desirable to determine which target satellite is currently closest (or adequately close) to the ground destination so that the packet can be routed along a path toward that satellite. Constellation geometry can be used to facilitate such routing. In particular, according to embodiments of the present invention, the satellite constellation can be configured to route packets toward the target satellite which is geometrically closest to the destination location. To facilitate this, geographic routing may be employed in which the destination address for each packet includes an indication of a geometric (geographic) location of the destination of the packet. This location can be part of the destination address, for example. Geographic routing can also be used in other scenarios. According to geographic routing, data packets specify a physical location of a destination, for example in a header thereof. The physical location can be given in terms of spatial coordinates, which may be specified for example using latitude and longitude, coordinates in a polar coordinate system, or coordinates in a Cartesian coordinate system.

Packet routing typically involves a node (e.g. a satellite), when in possession of a packet, identifying a next-hop node to which to forward the packet. This next-hop node should be nominally "closer" to a target node (e.g. target satellite) and final packet destination than the current node. The target node can be selected as a node, which is within a limited local neighbourhood of the node holding the packet, and which is closest to the final packet destination, or among the closest nodes to the final packet destination. Routing tables can be maintained for the purpose of identifying suitable next-hop nodes based on packet destination information. Distributed link-state routing protocols, such as open shortest path first (OSPF) protocols, can be used to maintain routing tables. Link state information can be shared between nodes using control plane messaging.

In networks involving mobile nodes, such as LEO satellite nodes, the relative motion of satellites with respect to each other, ground nodes, or both, can result in time-varying network topology and link availability. Maintaining routing tables and link state information globally therefore becomes a challenging task. It is therefore useful to consider alternative routing methods, which can be implemented using limited information. The limited information may include node location and link state information for only those nodes in a local neighbourhood of a given node making a routing decision. For example, according to embodiments of the present invention, each network node maintains node location and link status information for a limited portion of the network that is local to that network node. The packet specifies its destination location, for example using geographic coordinates in a header thereof. As such, a network node can determine distance from each node in its local neighbourhood to the final destination.

FIG. 1 illustrates orthodromic distance 105 between two satellites 110, 115 orbiting a sphere (earth) 120. The orthodromic distance 107 between two points 112, 117 on the sphere is also shown. Point 112 is located at the intersection of the sphere 120 with a line or vector passing through a given point 125 (typically at the center of the sphere 120) and also passing through the location of the satellite 110. Point 117 is located at the intersection of the sphere 120 with a line or vector passing through the given point 125 and also passing through the location of the satellite 115. The orthodromic distance 107 is the length of an arc located between the points 112 and 117, where the arc is part of a circle defined by the intersection of a surface of the sphere 120 with a plane passing through points 112, 117 and 125. (Note that the plane can be equivalently defined as passing through the locations of satellites 110, 115 and point 125.) The orthodromic distance 105 is similarly the length of an arc between the locations of satellites 110 and 115, where the arc is part of a circle defined by the intersection of a sphere concentric with the sphere 120 and containing the orbits of the satellites 110, 115. Orthodromic distance is also referred to as great circle distance.

Embodiments of the present invention relate to routing and forwarding of data packets in a communication network. The data packets employ geographic routing, so that they specify a physical destination location, for example in headers thereof. With reference to FIG. 2, a method 200 provided according to such embodiments includes maintaining 210 physical location information for nodes in a limited portion of the network directly coupled to the first node. The physical location information can be provided in terms of geographic coordinates, such as but not necessarily limited to latitude/longitude coordinates. The method further includes maintaining 220 routing information for the limited portion of the network. The routing information can include, for example, current availability of communication links between nodes in this limited portion of the network.

For clarity, it can be considered that the limited portion of the network includes at least one node which is indirectly coupled to the first node via at least one intermediate node. That is, the limited portion of the network includes more than just the nodes that are within one hop of the first node. Although this is not strictly necessary for operability, it allows for meaningful routing to be performed within the limited portion of the network.

The method 200 further includes selecting 230 a target node. The target node is selected, from among the nodes in the limited portion of the network, such that the target node that meets a predetermined objective with respect to orthodromic (great circle) distance to the physical location of the destination for the data packet. The objective may be, for example, that the target node is the closest node (in the limited portion of the network) to the data packet destination, or that the target node is among the k relatively closest nodes (in the limited portion of the network) to the data packet destination.

In support of selecting the target node, the method may include determining respective orthodromic distances (or approximations thereof) between at least some of the nodes in the limited portion of the network and the physical location of the data packet destination. The orthodromic distances may be determined based on a Haversine or Cartesian function calculation, or an approximation thereof.

The method 200 further includes determining 240, based on the routing information, a next node, belonging to the limited portion of the network and located along an available network path between the node and the target node. The next node can be determined using a shortest path first (SPF) algorithm, for example, based only on information regarding the limited portion of the network. The method further includes forwarding 250 the packet toward said next node. The method 200 may then be repeated at the next node, or at some or all subsequent nodes in receipt of the packet.

According to the above, each node of the network operates within a limited, pre-defined portion of the network that is a strict subset of the entire network. The node maintains information for this limited portion of the network. Within this limited portion, routing can occur, for example using a routing protocol such as or similar to the open shortest path first (OSPF) protocol. The routing may use a geographic address specified in the packet. This causes the data packet to be forwarded toward a target node that is closer to the data packet destination. The node that is next along a path to the target node is referred to as the next node. The node routes the packet to the next node which is on the path (e.g. a shortest path first (SPF) path) to the target node. The shortest path first computation can involve Dijkstra's algorithm. The above process can be repeated at multiple nodes, for example at each node in receipt of the data packet being forwarded.

Figure 3A:
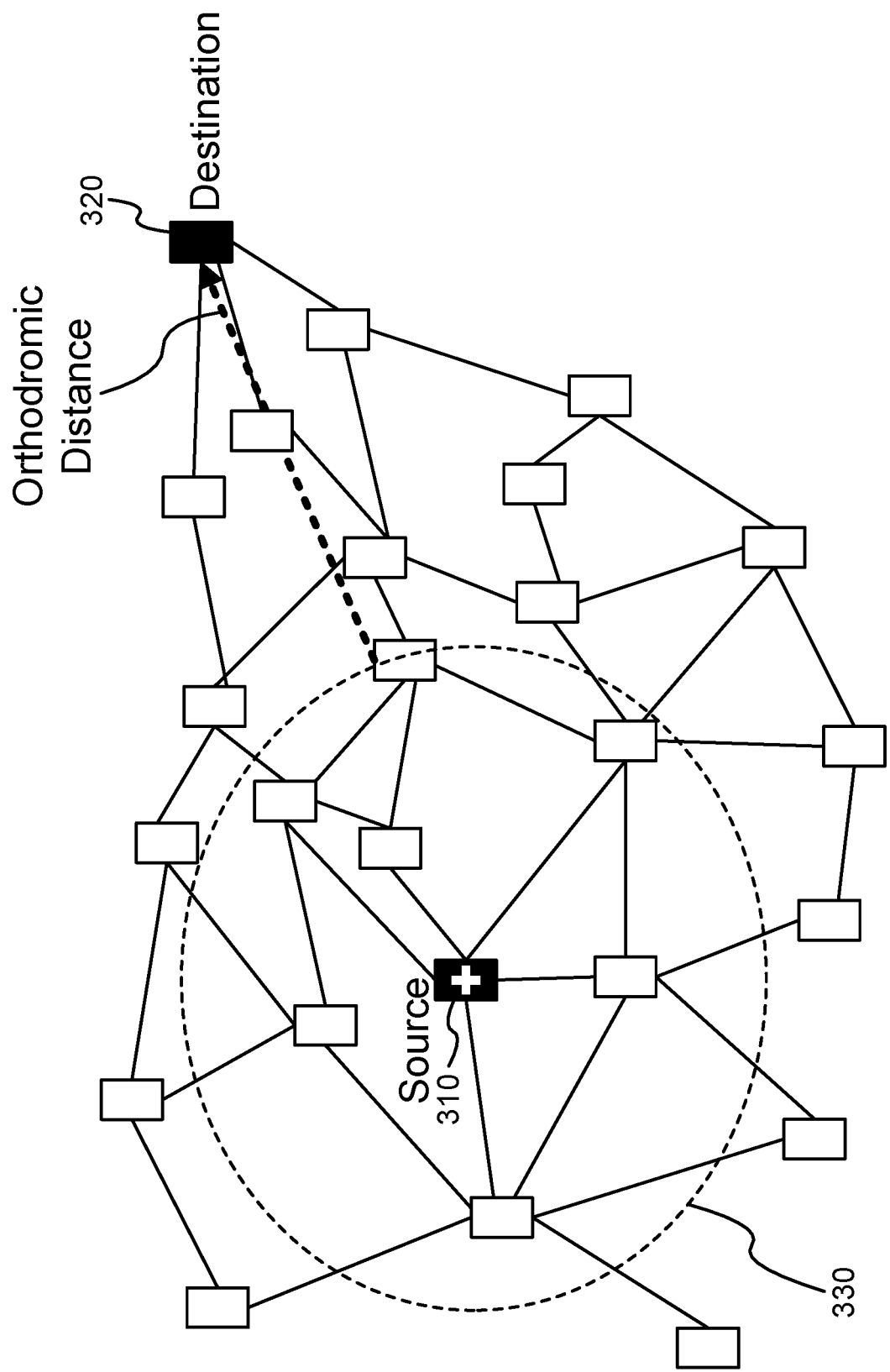
FIG. 3A illustrates a portion of a network showing packet routing operations at a first node, according to an example embodiment of the present invention.
Figure 3B:
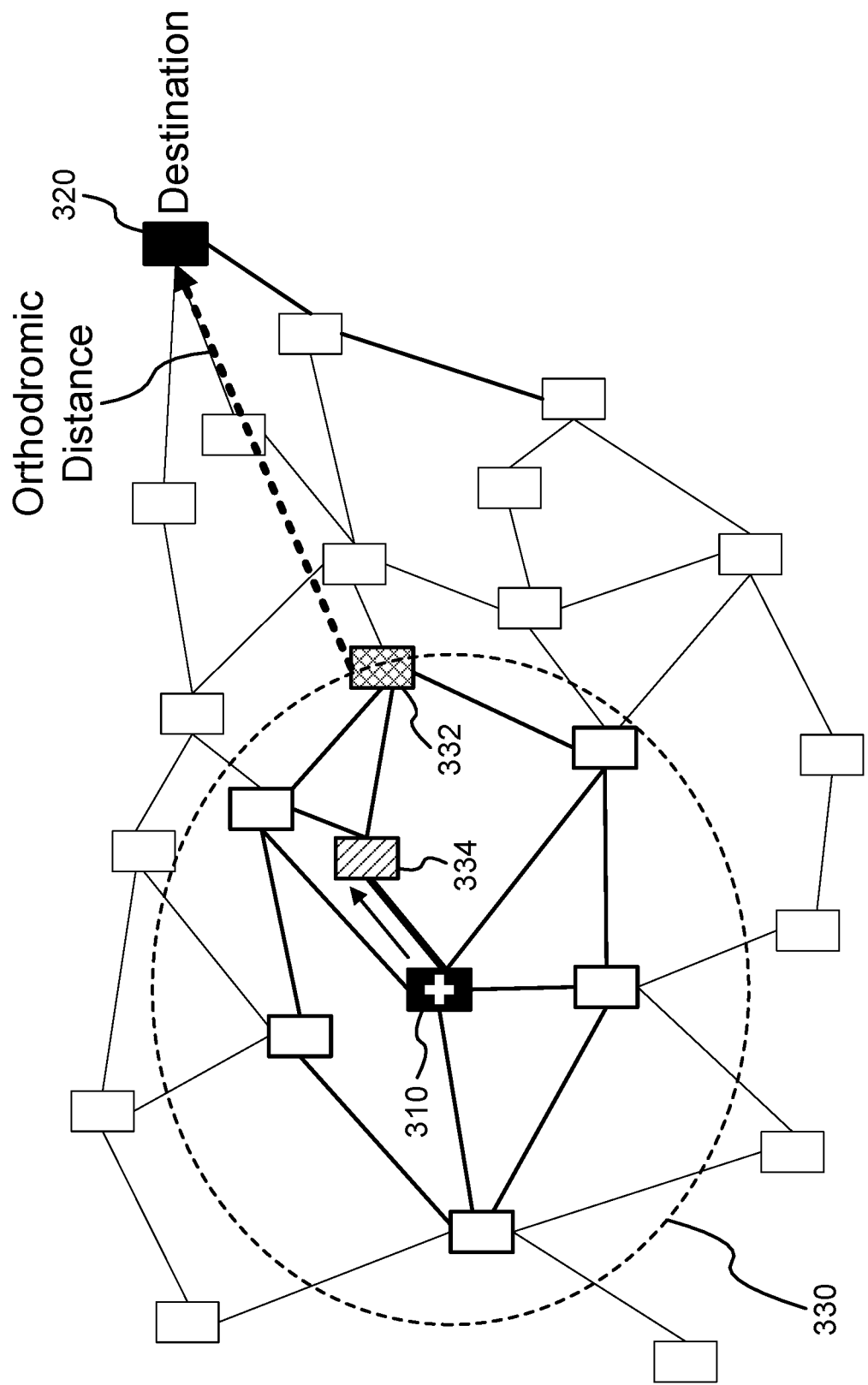
FIG. 3B further illustrates the portion of the network of FIG. 3A, showing additional packet routing operations at the first node, according to the example embodiment of the present invention.

FIG. 3A illustrates an example network with an irregular topology. A first node 310 in possession of the data packet and a destination 320 for the data packet are shown. Further illustrated is a limited portion 330 of the network coupled to the first node 310. This limited portion 330 can also be referred to as the routing region for the first node 310. According to an embodiment of the present invention, the first node determines a target node 332 within the limited portion 330 of the network. FIG. 3B illustrates the target node 332.

In one embodiment, the target node 332 is selected as the node, within the limited portion 330 of the network, which has minimum orthodromic distance to the destination 320. As mentioned above, the orthodromic distance can be calculated using the Haversine formula, based on latitude and longitude coordinates of the nodes, or based on an associated Cartesian formula. The orthodromic distance to the destination 320 can be determined for multiple network nodes, for example some or all nodes within the limited portion 330 of the network. The node with minimum orthodromic distance to the destination can then be selected from among these multiple nodes. For this purpose, the first node 310 can maintain physical location information for some or all nodes in the limited portion 330 of the network.

Routing information for this limited portion 330 of the network is also maintained, which may include information regarding available communication links between the nodes in the limited portion 330 of the network. Location and routing information can be maintained for example by passing messages among nodes, the messages being indicative of and in response to location changes, routing changes, or both. The routing information may include a routing table which is maintained based on one or both of: dynamic updates of status of communication links between nodes in the limited portion of the network; and dynamic changes to a topology of the network. The topology of the network can refer to the presence of nodes and links in the network, for example the limited portion thereof.

Still referring to FIG. 3B, the first node then uses its routing information (e.g. routing table) to determine a next node 334, directly coupled to the first node, to which the packet is to be forwarded. The next node 334 is along a viable (e.g. shortest) path to the target node 332. The first node may select the target node based on latitude/longitude information. The first node may then look up, in its (e.g. SPF) routing table, the correct next node which is the next-hop node along a path toward the selected target node. Various criteria can be used to select the next node, as will be readily understood by a worker skilled in the art. For example, the next node may be selected as belonging to a SPF route determined using Dijkstra's algorithm. However, the next node should be along a viable network path between the first node and target node. The viable network path chosen can be a preferred path to the target node, which is determined based on a predetermined rule, such as the SPF rule. For clarity, the next node is the node which is directly coupled to the first node and which lies along this preferred path.

Figure 3C:
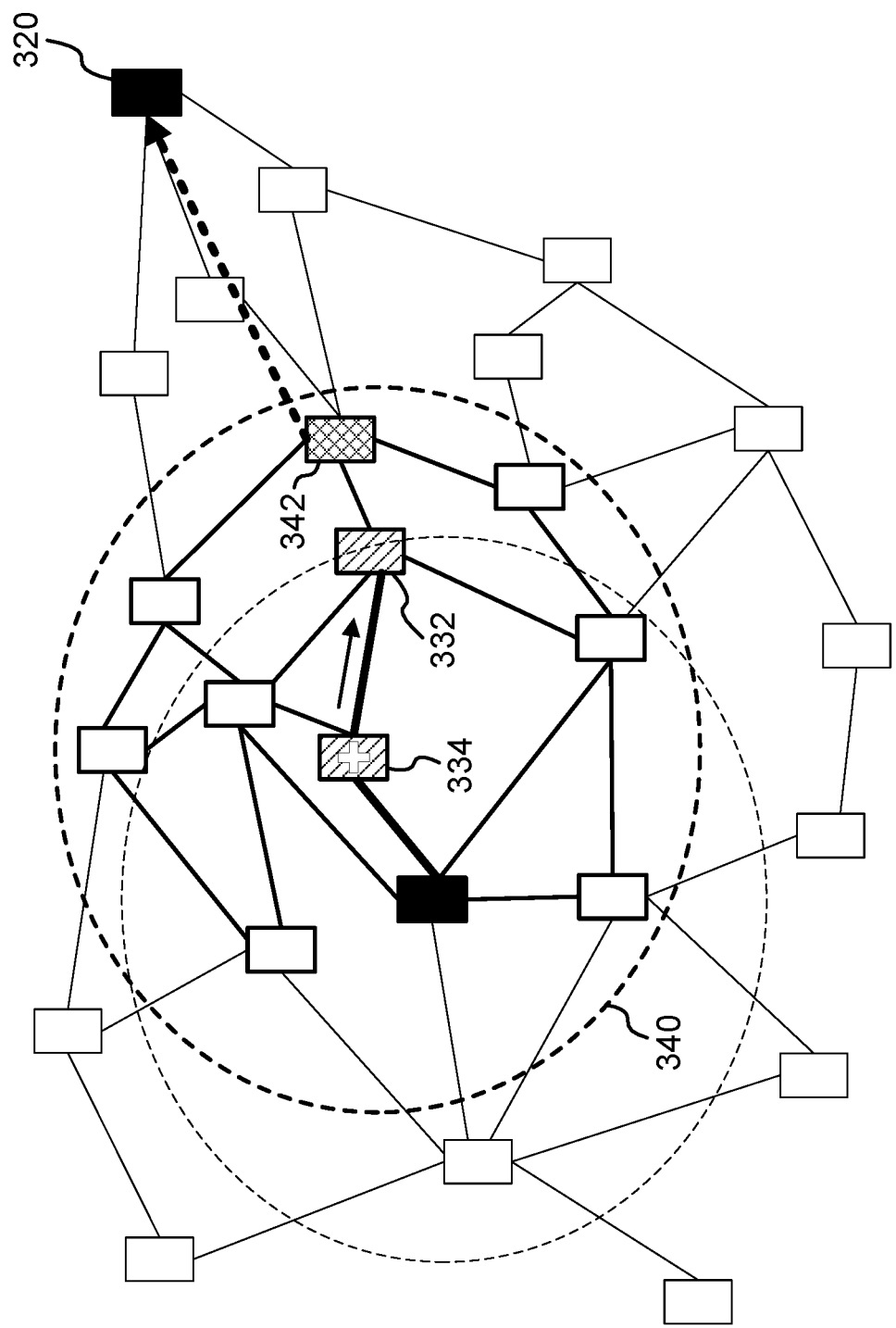
FIG. 3C further illustrates the portion of the network of FIG. 3A, showing packet routing operations at a second node, according to the example embodiment of the present invention.

FIG. 3C illustrates repetition of the process by the next node 334, upon receipt of the packet thereby. The next node 334 sees (i.e. maintains location information and routing information for) a different limited portion 340 of the network, and selects another target node 342 as the node, within the different limited portion 340 of the network, which has minimum orthodromic distance to the destination 320. The node 334 then uses its routing information to select a further next node, which happens to be the node 332, to which the packet is to be forwarded. This further next node 332 is along a viable path to the target node 342. In other words, the next node 334 repeats the same process as the first node 310.

Figure 3D:
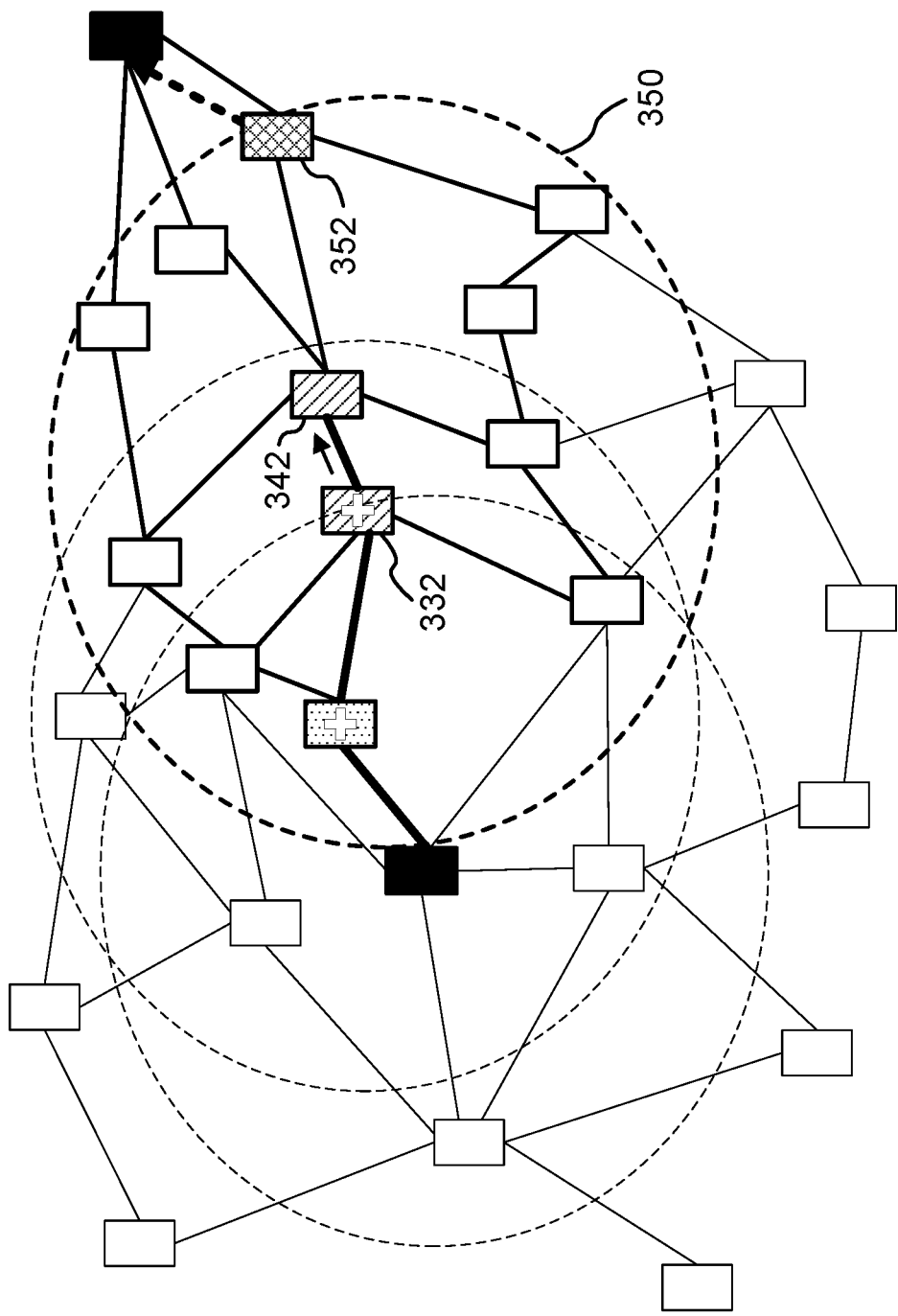
FIG. 3D further illustrates the portion of the network of FIG. 3A, showing packet routing operations at a third node, according to the example embodiment of the present invention.
Figure 3E:
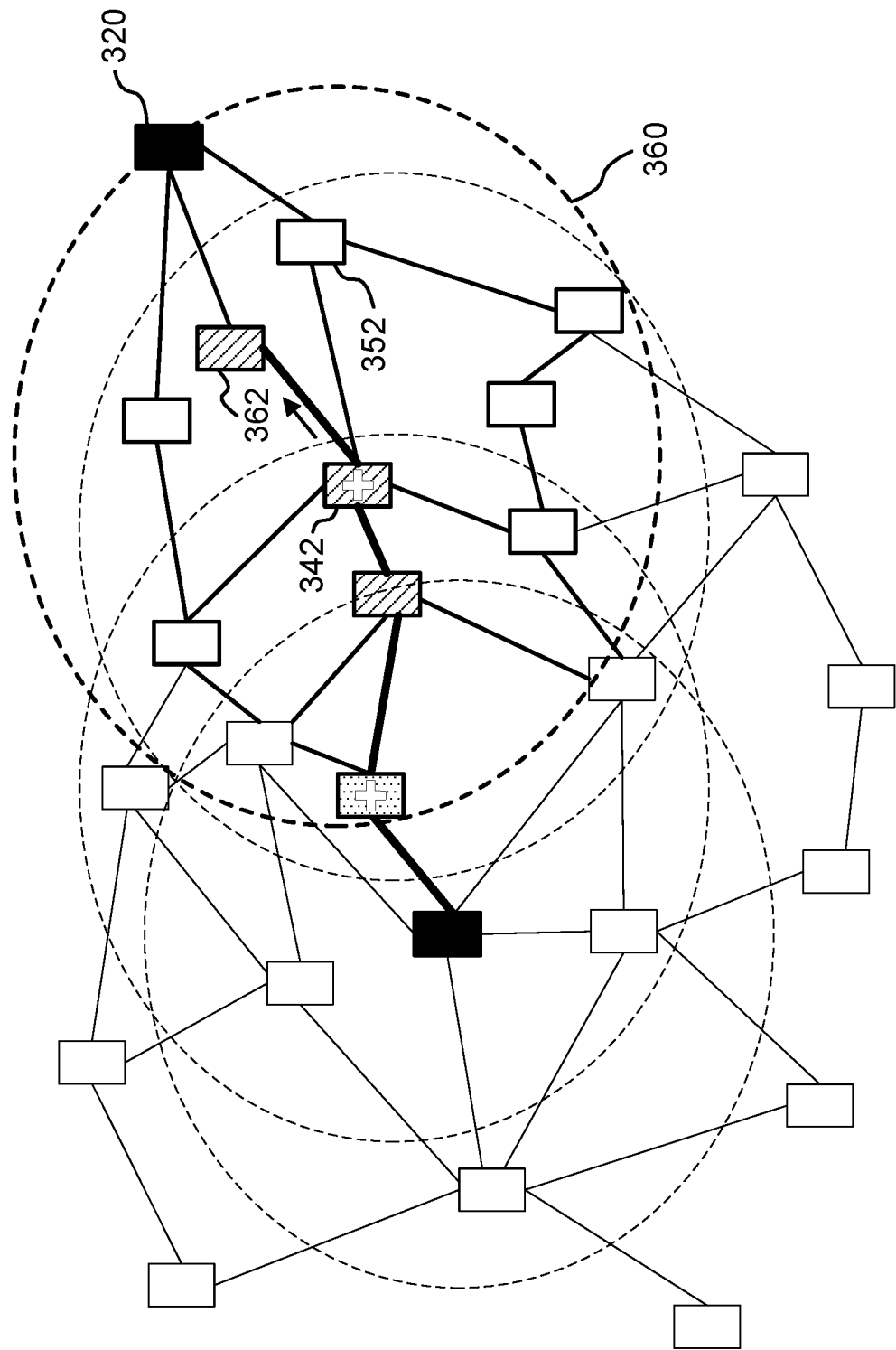
FIG. 3E further illustrates the portion of the network of FIG. 3A, showing packet routing operations at a fourth node, according to the example embodiment of the present invention.
Figure 3F:
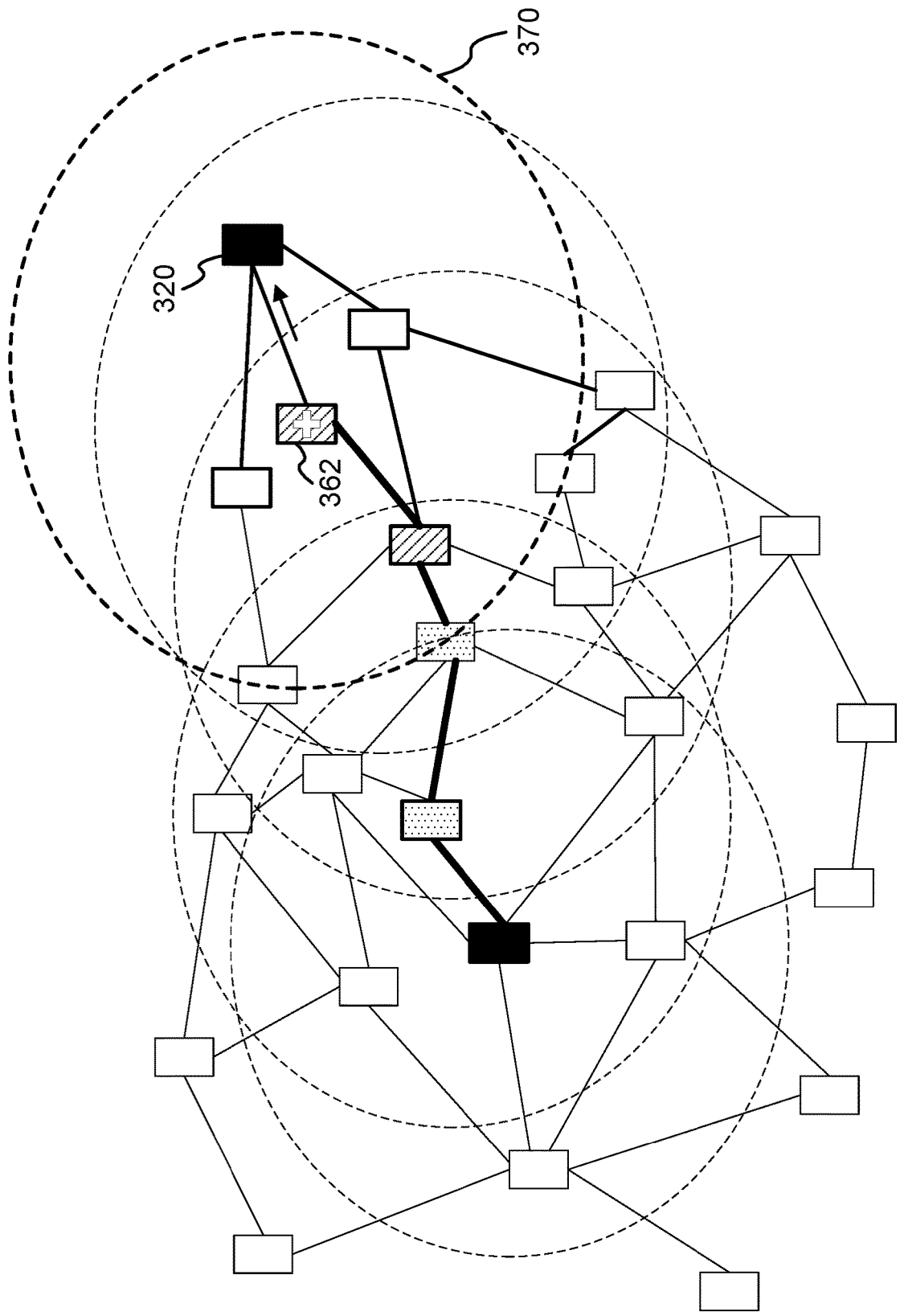
FIG. 3F further illustrates the portion of the network of FIG. 3A, showing packet routing operations at a fifth node, according to the example embodiment of the present invention.

For completeness, FIGS. 3D, 3E and 3F illustrate repetition of this process three more times. In FIG. 3D, node 332, in possession of the packet, sees a limited portion of the network 350, selects target node 352, and forwards the packet to a selected next node along a viable path to the target node 352. This selected next node happens to be node 342. The limited portions of networks seen by adjacent nodes are typically overlapping, as illustrated.

In FIG. 3E, node 342, in possession of the packet, sees a limited portion of the network 360, which now includes the destination 320. As such, node 342 selects the destination 320 to be the target node. Node 342 forwards the packet to a selected next node along a viable path to the target node 320. This selected next node is node 362. Note that node 352 could have also been the selected next node; however node 342 has different information than node 332, leading to a change in routing path. That is, packets are not guaranteed to pass through target nodes from a previous stage. The set of target nodes and intermediate nodes traversed by the packet may be different.

In FIG. 3F, node 362, in possession of the packet, sees a limited portion of the network 370, which includes the destination 320. Node 362 forwards the packet to a selected next node along a viable path to the target node 320. This selected next node in this case is in fact the target node 320. The selected target node is actually the final packet destination, and the distance from the selected target node to the destination is zero.

In the above example, the target node may be selected as the single node which is closest (in orthodromic distance) to the packet final destination. The selection is from among all nodes in the limited portion of the network. However, in various other embodiments, the target node may be selected as one node among a plurality of candidate target nodes which are relatively closer to the packet final destination, or which meet some other predetermined objective. For example, the k nodes which are closest (in orthodromic distance) to the packet final destination can be determined, and the target node can be selected from among these k nodes. The selection can be random or based on a predetermined and potentially arbitrary rule.

As mentioned above, the orthodromic distance between two nodes can be determined based on the Haversine function. The Haversine function is used to determine the great circle distance between two points on the surface of a sphere given their coordinates in latitude and longitude. The Haversine function itself is given by the formula:

$$d = 2r \arcsin\left(\sqrt{\sin^2\left(\frac{\varphi_2 - \varphi_1}{2}\right) + \cos\varphi_1 \cos\varphi_2 \sin^2\left(\frac{\lambda_2 - \lambda_1}{2}\right)}\right)$$

Here, d is the distance, r is the radius of the sphere (earth) and $(\varphi_1, \lambda_1)$ and $(\varphi_2, \lambda_2)$ are the (latitude, longitude) coordinates of the first and second of the two points, respectively.

The 2r term can be removed from this formula for computation of a distance metric as it applies equally to all distances.

It is noted that the orthodromic distance can be approximated without necessarily evaluating the Haversine function for every pair of points. For example, a lookup table operation or evaluation operation using a simpler (e.g. polynomial or piecewise function) can be performed. The output of this operation can be approximately the same as the output of the Haversine function. Furthermore, the operation approximating the Haversine function does not necessarily need to be an accurate approximation. The distance measurement is used in the present invention to compare different pairs of distances. In particular, the approximate distance metric only requires the property that, whenever the distance (e.g. as measured using Haversine) between points A and B is greater than the distance between points C and D, the approximate distance metric applied to points A and B yields a greater value than the approximate distance metric applied to points C and D (note points A and C can be the same point). For purposes of the present invention, this approximate distance metric qualifies as an approximate Haversine function. The approximation is such that, the routing decisions (i.e. the target node selection) made using the approximation is substantially the same as the routing decisions that would be made using the Haversine function, or another function which accurately determines orthodromic distance.

Alternatively, orthodromic distance can be evaluated using a Cartesian approach, which is described as follows. The locations of two points on the surface of a sphere (e.g. Earth or an orbital sphere surrounding Earth at a given altitude) are specified by two vectors P1 and P2. The two vectors originate at a location O, typically the center of sphere, and the first vector terminates at the first point while the second vector terminates at the second point. The two vectors are specified in a three-dimensional Cartesian coordinate system. Vector P1 has X, Y and Z coordinates in this coordinate system as given by the vector values (P1x, P1y, P1z), while Vector P2 has coordinates given by values (P2x, P2y, P2z). In this case, it can be shown that the orthodromic distance between the two points is a function of the dot product of the two vectors P1 and P2. Specifically, the orthodromic distance is given by:

$$d = \cos^{-1}(P1x*P2x + P1y*P2y + P1z*P2z) = \cos^{-1}(P1 \cdot P2)$$

Approximations of the orthodromic distance given by the above function can also be used. For example, the function $\cos^{-1}$ can be replaced with an approximation, such as a linear or polynomial approximation. The Cartesian function indicated above can be approximated in various ways similarly to the Haversine function.

According to the Cartesian function, orthodromic distance between two network locations can be determined or approximated by computing an inner product of a first vector and a second vector, the first vector originating at a first point (e.g. center of Earth) and directed toward one of the network locations, and the second vector originating at the first point and directed toward the other one of the network locations. One of the network locations can be the location of a node in the limited portion of the network, and the other can be the physical location of the destination for the data packet.

For simplicity, and in some embodiments, when the two locations are at different altitudes (e.g. one is the location of a terrestrial network node and the other is the location of a satellite node), the two nodes can be treated as if they are at a common altitude for purposes of computing orthodromic distance. In other embodiments, an additional distance can be added to the computed orthodromic distance, in order to reflect the altitude difference.

The limited portion of the network can be of a particular or configurable size. Larger sizes generally require higher maintenance, for example in terms of message passing and computation, in order to keep routing tables up to date. However, larger sizes are also advantageous because it is more likely that the shortest path to the target node is closer to being along the shortest path to the packet's final destination. The limited portion of the network can be sized based on operational requirements. For example, the sizing can be set based on link outage characteristics of the network. When link outages are expected to be more frequent, the limited portion of the network can be of a larger size, thus encompassing more nodes. When link outages are expected to be less frequent, the limited portion of the network can be made smaller.

The size of the limited portion of the network (for one or more nodes) can be specified for example in terms of number of hops, radius, or spatial region. For example, the limited portion of the network may be specified as encompassing all nodes of the network which are within a predetermined number (e.g. greater than one) of hops from the first node, or encompassing all nodes of the network which are within a predetermined distance of the first node; or encompassing all nodes which are in a predetermined spatial region (such as a sphere or regular or irregular region) containing or adjacent to the first node. The first node can be on the edge of or within (e.g. at the center of) the limited portion of the network. Sizing of the limited portion of the network can then be controlled by adjusting the predetermined number of hops, the distance, or the spatial region. In this context, the first node is the node for which the limited portion of the network is being determined. Different nodes can see different respective limited portions of the network.

Because each node maintains physical location and routing information only for a limited portion of the network, (e.g., for all nodes within n-hops of the given node), each node only needs to maintain a limited amount of information. For example, each node may only need to maintain a database of information for a limited number of nodes, namely the nodes inside its limited portion of the network. Furthermore, nodes only need to calculate paths (e.g. using the SPF algorithm) considering the nodes within its limited portion, rather than all the nodes of the network. This not only reduces the amount of memory required in each node for keeping such a database, also decreases the SPF calculation time (Dijkstra run time). When the network portion is small enough, the SPF can be calculated almost in real time. However, for reliable routing, it is useful for each node to have the most up-to-date status for all the links in the limited portion of the network which that node sees. In some embodiments, to facilitate this, any event occurring with respect to any link or node is flooded to at least all the network nodes who would track status of this link or node in their database. That is, events in a given network location are communicated to those nodes which see that given network location as part of their limited portion of the network. This approach is expected to be simpler than network-wide flooding of status update messages, because the status update messages in response to a given event is limited to a fraction of the entire network. For instance if the network portion size is defined to be all nodes within n hops of a given node, any event (e.g. link/node failure or creation) may be required to be communicated to all network nodes within n hops of the event and not more. Notably, this reduces the complexity of control plane operations and also data plane operation as the forwarding table is small and can be looked up relatively quickly. The control plane operations can include, for example, flooding and updating network topologies at nodes, as well as updating the SPF computations and routing and forwarding tables.

Nodes in the network can be relatively stationary, or they may be mobile with respect to one another. For example, in a network involving satellite-based network nodes or terrestrial mobile network nodes, some or all nodes are relatively mobile. In response to motion of the nodes, the physical location information held by network nodes (relating to other nodes in their limited portion of the network) can change over time. This change can be in response to internally held schedules such as almanac or ephemeris data, or in response to external messages indicative of such location changes.

Figure 4:
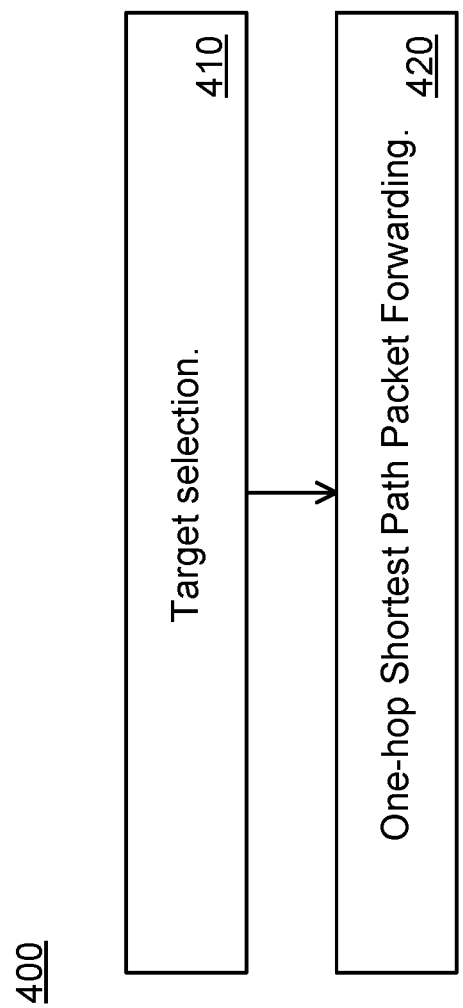
FIG. 4 illustrates a method for routing a data packet in a network, according to embodiments of the present invention.

FIG. 4 illustrates an orthodromic routing method 400 having two main phases, according to an embodiment of the present invention. In the first phase, target selection 410 is performed. The target selection involves selecting a target node meeting an objective in terms of orthodromic distance, as described herein. The target node can be selected from a limited portion of the network being tracked by the node making the target selection. In the second phase, one-hop shortest path packet forwarding 420 is performed, in which a next node is determined, which belongs to the limited portion of the network and is located along an available network path between the node and the target node, and the packet is forwarded toward this next node.

Some potential advantages provided by certain embodiments of the present invention are as follows. The issue of scaling in broadband satellite networks is addressed, by requiring each node only to track a limited portion of the network. Distributed link-state protocols are enabled in large flat networks. By using distance as a cost metric, performance and routing are directly linked. Routing scope of individual network elements is reduced, without necessarily requiring gateway routers. The requirement to flood information through the network is mitigated. Shortest path calculations and associated data structures are reduced. Use of link-state protocols is enabled with modification combined with geographic coordinates to simplify routing. All nodes potentially operate in the same manner. Multiple sub-network behavior is obtainable without the use of gateway routers. Computation and storage requirements are also reduced, which is beneficial to deployments where resources are limited (e.g. in satellites and IoT devices).

Although embodiments of the present invention are described primarily with respect to routing in satellite mesh networks (e.g. having polar or walker delta or other constellation configurations), it should be appreciated that the present invention may also be applied in other network scenarios, such as in other geometric or geographic based routing systems not necessarily involving satellites, or in other non-geometric or non-geographic based routing systems, for example in which packets are routed solely based on network address (e.g. arranged by nested subnets) and network topology. Embodiments of the present invention can be applied to networks which are either topologically stable or which have dynamic or hyper dynamic network topology changes.

Embodiments of the present invention can be implemented using electronics hardware, software, or a combination thereof. In some embodiments, the forwarding plane is implemented by one or multiple computer processors executing program instructions stored in memory. In some embodiments, the forwarding plane is implemented partially or fully in hardware, for example using one or more field programmable gate arrays (FPGAs) or application specific integrated circuits (ASICs) to rapidly perform the processing operations required for implementing forwarding plane operations. The forwarding plane operations can include determining costs or utilities (e.g. distances or approximate distances) associated with forwarding data packets to destination devices, determining subsets of destination devices having lowest costs or highest utilities, selecting one of the destination devices, and forwarding of a data packet to the selected destination device.

Figure 5:
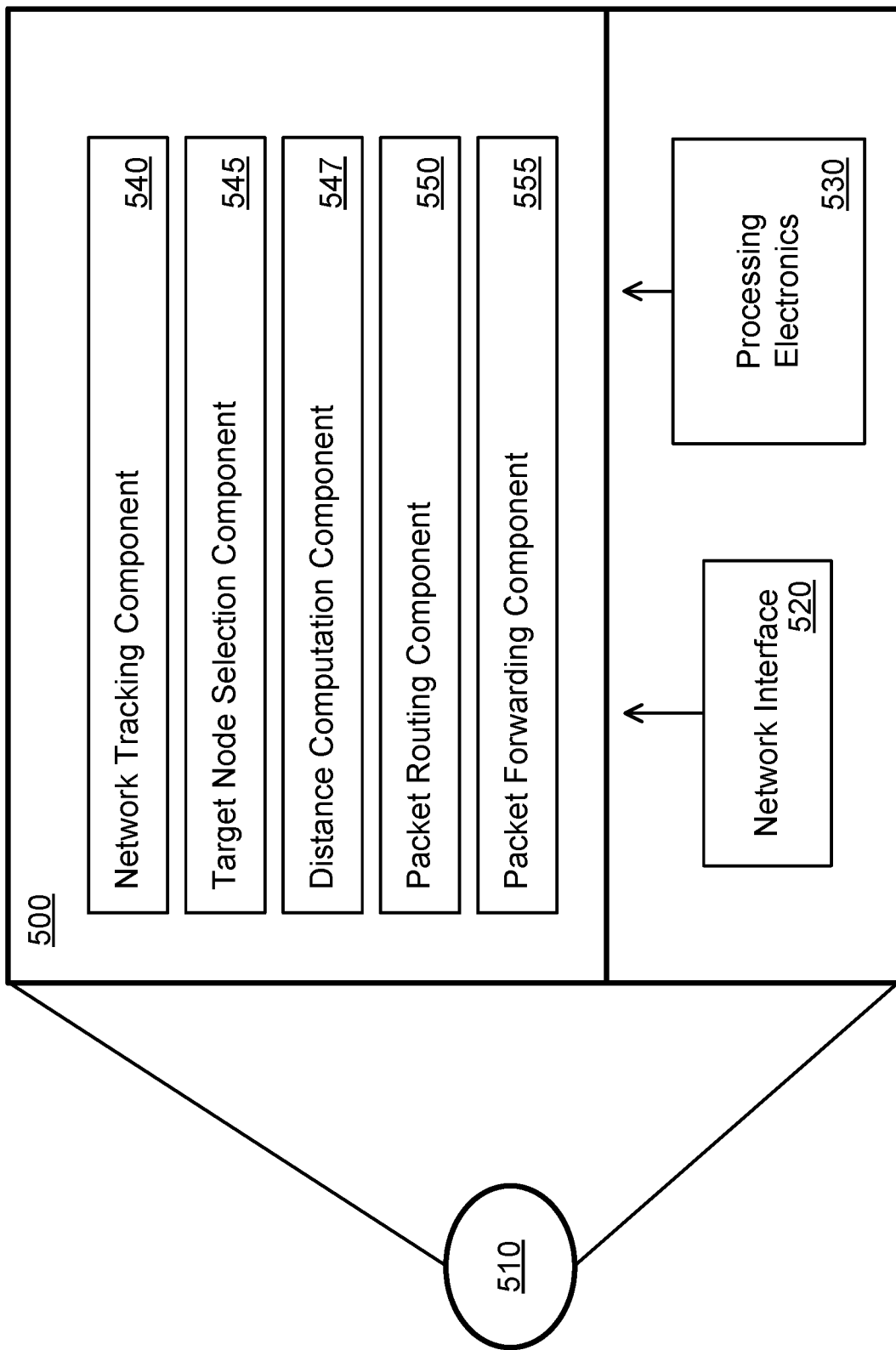
FIG. 5 illustrates an apparatus for routing data packets in a network, according to embodiments of the present invention.

FIG. 5 illustrates an apparatus 500 for routing data packets in a network, according to embodiments of the present invention. The apparatus is located at a node 510 of the network in possession of the data packet, such as but not necessarily limited to a satellite-based node. The apparatus includes a network interface 520 and processing electronics 530. The processing electronics can include a computer processer executing program instructions stored in memory, or other electronics components such as digital circuitry, including for example FPGAs and ASICs. The network interface can include an optical communication interface or radio communication interface, such as a transmitter and receiver. The apparatus can include several functional components, each of which is partially or fully implemented using the underlying network interface 520 and processing electronics 530.

The apparatus includes a network tracking component 540 which is configured to maintain current information regarding a limited portion of the network directly coupled to the node 510. The information can include physical location information for nodes in the limited portion of the network, and routing information for the limited portion of the network. The information can be maintained through receiving and processing control plane messages indicative of current network conditions, through predicting changes in network conditions based on internal models, or a combination thereof. The apparatus includes a target node selection component 545. The target node selection component is configured to select, from among the nodes in the limited portion of the network, a target node that meets a given objective with respect to orthodromic distance to the physical location of the destination for the data packet. This may involve selecting the target node as the node which is closest to the packet destination location, or selecting the target location from among the k nodes which are closest to the packet destination location.

The apparatus may include a distance computation component 547, which may be part of the target node selection component 545 or a separate component coupled thereto. The distance computation component is configured to determine orthodromic distances or approximate orthodromic distances between pairs of network nodes, or between network nodes and packet destination locations, or between geographic coordinates.

The apparatus further includes a packet routing component 550 which is configured to determine, based on the routing information, a next node belonging to the limited portion of the network and located along an available network path between the node and the target node. The next node can be determined based on a routing table, which selects the next node based on the target node. The routing table can be maintained by the network tracking component 540, based on the current network information. For this purpose, for example, the network tracking component can maintain the routing table in accordance with a shortest path first algorithm, which determines shortest paths to potential target nodes, and associates these with appropriate next nodes along respective shortest paths to target nodes.

The apparatus further includes a packet forwarding component 555 which is configured to forward the packet toward the next node using the network interface 520.

Figure 6:
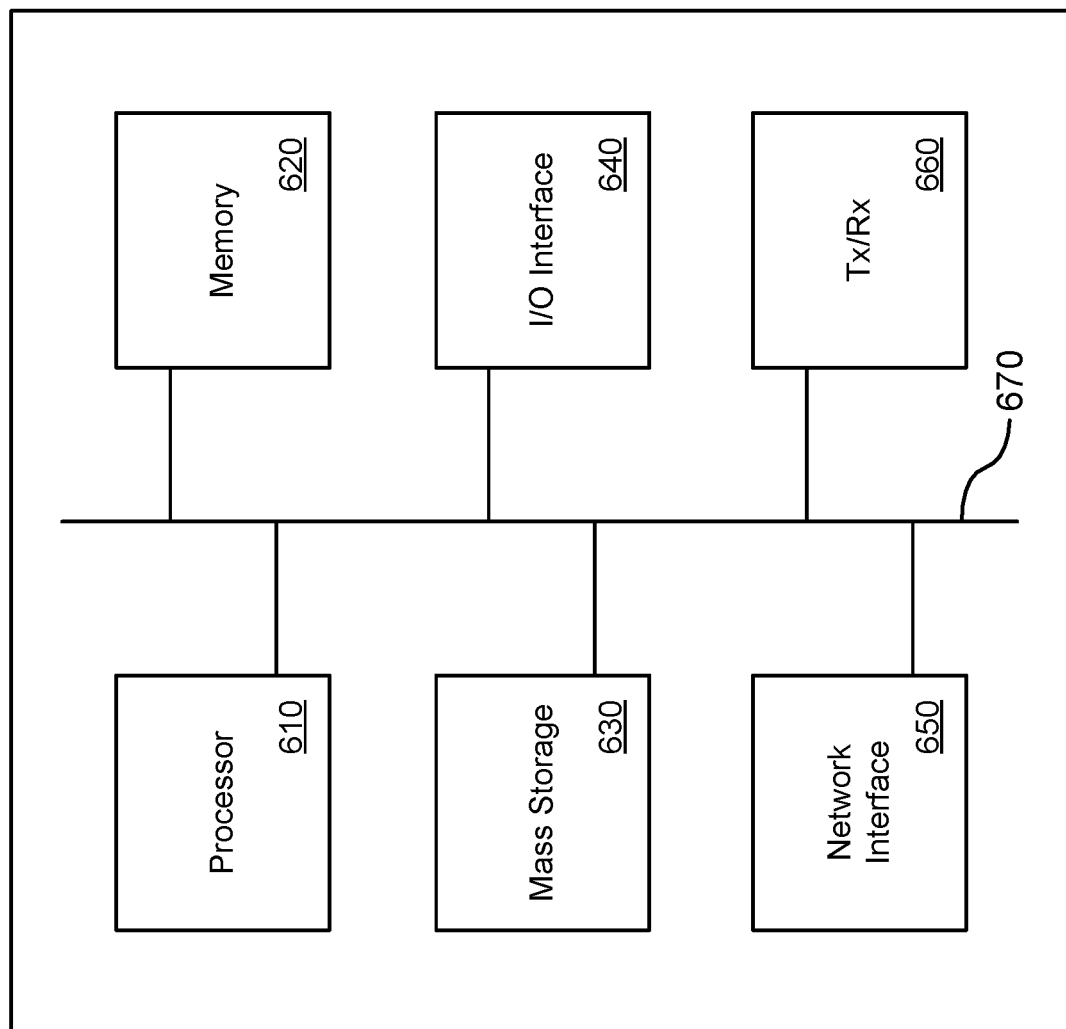
FIG. 6 is a schematic diagram of an electronic device that may perform any or all of operations of the above methods and features explicitly or implicitly described herein, according to different embodiments of the present invention.

FIG. 6 is a schematic diagram of an electronic device 600 that may perform any or all of operations of the above methods and features explicitly or implicitly described herein, according to different embodiments of the present invention. For example, a computer equipped with network function may be configured as electronic device 600. The electronic device 600 may be used to implement the apparatus 500 of FIG. 5, for example.

As shown, the device includes a processor 610, such as a Central Processing Unit (CPU) or specialized processors such as a Graphics Processing Unit (GPU) or other such processor unit, memory 620, non-transitory mass storage 630, I/O interface 640, network interface 650, and a transceiver 660, all of which are communicatively coupled via bi-directional bus 670. According to certain embodiments, any or all of the depicted elements may be utilized, or only a subset of the elements. Further, the device 600 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 620 may include any type of non-transitory memory such as static random access memory (SRAM), dynamic random access memory (DRAM), synchronous DRAM (SDRAM), read-only memory (ROM), any combination of such, or the like. The mass storage element 630 may include any type of non-transitory storage device, such as a solid state drive, hard disk drive, a magnetic disk drive, an optical disk drive, USB drive, or any computer program product configured to store data and machine executable program code. According to certain embodiments, the memory 620 or mass storage 630 may have recorded thereon statements and instructions executable by the processor 610 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for routing a data packet in a network, the data packet specifying a physical location of a destination for the data packet, the method comprising, at a first node of the network in possession of the data packet:
   maintaining physical location information for nodes in a limited portion of the network directly coupled to the first node, and maintaining routing information for the limited portion of the network, said limited portion of the network comprising at least one node which is indirectly coupled to the node via at least one intermediate node;
   selecting, from among the nodes in the limited portion of the network, a target node that meets a predetermined objective with respect to orthodromic distance to the physical location of the destination for the data packet;
   determining, based on the routing information, a next node belonging to the limited portion of the network and located along an available network path between the node and the target node; and
   forwarding the packet toward said next node.

2. The method of claim 1, further comprising determining respective orthodromic distances or approximations thereof between at least some of the nodes in the limited portion of the network and the physical location of the destination for the data packet.

3. The method of claim 2, wherein orthodromic distance is determined based on a Haversine function calculation, Cartesian function calculation, approximate Haversine function calculation, or approximate Cartesian function calculation, wherein the Cartesian function calculation comprises computing an inner product of a first vector and a second vector, the first vector originating at a first point and directed toward a physical location of one of the nodes in the limited portion of the network, and the second vector originating at the first point and directed toward the physical location of the destination for the data packet.

4. The method of claim 1, wherein the routing information comprises a routing table which is maintained based on one or both of: dynamic updates of status of communication links between nodes in the limited portion of the network; and dynamic changes to a topology of the network.

5. The method of claim 1, wherein determining the next node comprises determining, based on a predetermined rule, a preferred path through the limited portion of the network to the target node, and determining the next node as being a node directly coupled to the first node and lying along said preferred path.

6. The method of claim 1, wherein the physical location of the destination is encoded into a header of the data packet.

7. The method of claim 1, wherein the physical location of the destination is specified using latitude and longitude, coordinates in a polar coordinate system, or coordinates in a Cartesian coordinate system.

8. The method of claim 1, wherein the limited portion of the network comprises one or more of: all nodes of the network which are within a predetermined number of hops from the first node, said predetermined number being greater than one; all nodes of the network which are within a predetermined distance of the first node; and all nodes which are in a predetermined spatial region containing or adjacent to the first node.

9. The method of claim 8, wherein the predetermined number, the predetermined distance or the predetermined spatial region is determined based on link outage characteristics of the network.

10. The method of claim 1, wherein said physical location information for the nodes changes over time in response to motion of said nodes.

11. The method of claim 1, wherein some or all of the network node and the nodes in the limited portion of the network are satellite-based network nodes.

12. The method of claim 1, further comprising selecting the target node from among a plurality of candidate target nodes, the plurality of candidate target nodes being nodes in the limited portion of the network which meet the predetermined objective.

13. The method of claim 12, wherein the predetermined objective specifies that a node in the limited portion of the network is one of the candidate target nodes when said node is among k nodes in the limited portion of the network which are closest, with respect to orthodromic distance, to the physical location of the destination for the data packet.

14. The method of claim 1, wherein the predetermined objective specifies that the target node is closest in orthodromic distance, among all nodes in the limited portion of the network, to the physical location of the destination for the data packet.

15. A method for routing a data packet in a network, the data packet specifying a physical location of a destination for the data packet, the method comprising, at each node of a plurality of nodes of the network, when in possession of the data packet:
   maintaining physical location information for respective nodes in a limited portion of the network directly coupled to the node, and routing information for the limited portion of the network, said limited portion of the network comprising at least one node which is indirectly coupled to the node via at least one intermediate node;

selecting, from among the nodes in the limited portion of the network, a target node that meets a predetermined objective with respect to orthodromic distance to the physical location of the destination for the data packet;

determining, based on the routing information, a next node belonging to the limited portion of the network and located along an available network path between the node and the target node; and forwarding the packet to said next node.

16. An apparatus for routing a data packet in a network, the data packet specifying a physical location of a destination for the data packet, the apparatus located at a first node of the network in possession of the data packet, the apparatus comprising a network interface and processing electronics and configured to:

maintain physical location information for nodes in a limited portion of the network directly coupled to the first node, and maintain routing information for the limited portion of the network, said limited portion of the network comprising at least one node which is indirectly coupled to the node via at least one intermediate node;

select, from among the nodes in the limited portion of the network, a target node that meets a predetermined objective with respect to orthodromic distance to the physical location of the destination for the data packet;

determine, based on the routing information, a next node belonging to the limited portion of the network and located along an available network path between the node and the target node; and forward the packet toward said next node.

17. The apparatus of claim 16, further configured to determine respective orthodromic distances or approximations thereof between at least some of the nodes in the limited portion of the network and the physical location of the destination for the data packet.

18. The apparatus of claim 16, wherein determining the next node comprises determining, based on a predetermined rule, a preferred path through the limited portion of the network to the target node, and determining the next node as being a node directly coupled to the first node and lying along said preferred path.

19. The apparatus of claim 16, wherein the limited portion of the network comprises one or more of: all nodes of the network which are within a predetermined number of hops from the first node, said predetermined number being greater than one; all nodes of the network which are within a predetermined distance of the first node; and all nodes which are in a predetermined spatial region containing or adjacent to the first node.

20. The apparatus of claim 19, wherein the predetermined number, the predetermined distance or the predetermined spatial region is determined based on link outage characteristics of the network.

21. The apparatus of claim 16, further configured to select the target node from among a plurality of candidate target nodes, the plurality of candidate target nodes being nodes in the limited portion of the network which meet the predetermined objective.

22. The apparatus of claim 21, wherein the predetermined objective specifies that a node in the limited portion of the network is one of the candidate target nodes when said node is among k nodes in the limited portion of the network which are closest, with respect to orthodromic distance, to the physical location of the destination for the data packet.

23. The apparatus of claim 16, wherein the predetermined objective specifies that the target node is closest in orthodromic distance, among all nodes in the limited portion of the network, to the physical location of the destination for the data packet.

* * * * *